(12) United States Patent
Lin et al.

(10) Patent No.: US 10,730,293 B1
(45) Date of Patent: Aug. 4, 2020

(54) MEDIUM CLASSIFICATION MECHANISM

(71) Applicants: Juan Lin, Boulder, CO (US); Nikita Gurudath, Boulder, CO (US); Mikel John Stanich, Longmont, CO (US)

(72) Inventors: Juan Lin, Boulder, CO (US); Nikita Gurudath, Boulder, CO (US); Mikel John Stanich, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/286,775

(22) Filed: Feb. 27, 2019

(51) Int. Cl.
*B41J 2/125* (2006.01)
*G06N 20/00* (2019.01)
*B41J 2/015* (2006.01)
*B41J 11/00* (2006.01)

(52) U.S. Cl.
CPC .............. *B41J 2/125* (2013.01); *B41J 2/015* (2013.01); *B41J 11/009* (2013.01); *G06N 20/00* (2019.01)

(58) Field of Classification Search
CPC .......... B41J 2/125; B41J 2/015; B41J 11/009; G06N 20/00
See application file for complete search history.

(56) References Cited

U.S. PATENT DOCUMENTS

| | | | |
|---|---|---|---|
| 6,322,192 B1 | 11/2001 | Walker | |
| 6,325,505 B1 | 12/2001 | Walker | |
| 6,425,650 B1 | 7/2002 | Walker et al. | |
| 8,139,860 B2 | 3/2012 | Liu et al. | |
| 8,144,368 B2 | 3/2012 | Rodriguez et al. | |
| 8,412,055 B2 | 4/2013 | Chandu et al. | |
| 9,489,162 B2 | 11/2016 | Piazza et al. | |
| 9,661,154 B1 | 5/2017 | Stanich et al. | |
| 2011/0096118 A1 | 4/2011 | Burke et al. | |
| 2011/0280589 A1* | 11/2011 | Chandu | H04N 1/6097 399/15 |
| 2012/0139986 A1 | 6/2012 | Powers et al. | |
| 2013/0176600 A1* | 7/2013 | Chandu | H04N 1/405 358/3.06 |

FOREIGN PATENT DOCUMENTS

| | | |
|---|---|---|
| EP | 1396346 A1 | 3/2004 |
| WO | 2004051917 A1 | 6/2004 |
| WO | 2018058090 A1 | 3/2018 |

\* cited by examiner

*Primary Examiner* — Lamson D Nguyen
(74) *Attorney, Agent, or Firm* — Jaffery Watson Mendonsa & Hamilton LLP

(57) ABSTRACT

A system is disclosed. The system includes at least one physical memory device to store medium classification logic and one or more processors coupled with the at least one physical memory device to execute the medium classification logic to receive optical density (OD) measurement data corresponding to application of a halftone pattern using ink on a print medium in a printing system, receive ink deposition measurement data corresponding to application of the halftone pattern using the ink in a printing system, determine a set of distribution function parameters based on the OD measurement data and the ink deposition measurement data, apply the set of distribution function parameters to machine learning logic trained to classify the print medium and classify the print medium as a first of a plurality of print medium categories based on the machine learning logic.

20 Claims, 9 Drawing Sheets

MEDIUM CLASSIFICATION MECHANISM

FIELD OF THE INVENTION

The invention relates to the field of image reproduction, and in particular, to categorizing print media for print production.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead contains many nozzles for the ejection of ink or any colorant suitable for printing on a medium. The ink in any one of the nozzles may be one of a plurality of types (e.g. dye, pigment, Cyan, Magenta, BlacK or Yellow)

The type of print medium implemented at the printing system effects print quality (e.g., optical density, color fidelity, rub off, smearing, etc.). Thus, it is often necessary to apply a paper setting to the printing system, which is used to select the calibration for the printing system prior to the production of a print job. The calibration for the printing system sets various printing system operational parameters to values that control the print quality of the production of the print job onto the print medium. The paper setting may include multiple (e.g., 3) settings that correspond to categories of paper.

Typically a paper setting is entered into the printing system by a system operator, who often selects the setting based on a personal judgement of the paper type. Such a selection method is susceptible to human error. Another method of categorizing paper type for the paper setting is to perform physical and chemical tests on the paper. However, this method is time consuming and requires extensive lab analysis.

Accordingly, a mechanism to classify a medium for print production is desired.

SUMMARY

In one embodiment, a method is disclosed. The method includes receiving optical density (OD) measurement data corresponding to application of a halftone pattern using ink on a print medium in a printing system, receiving ink deposition measurement data corresponding to application of the halftone pattern using the inks in a printing system, determining a set of distribution function parameters based on the OD measurement data and the ink deposition measurement data, applying the set of distribution function parameters to machine learning logic trained to classify the print medium and classifying the print medium as a first of a plurality of print medium categories based on the machine learning logic.

BRIEF DESCRIPTION OF THE DRAWINGS

A better understanding of the present invention can be obtained from the following detailed description in conjunction with the following drawings, in which.

DETAILED DESCRIPTION

A mechanism to classify a medium for print production is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
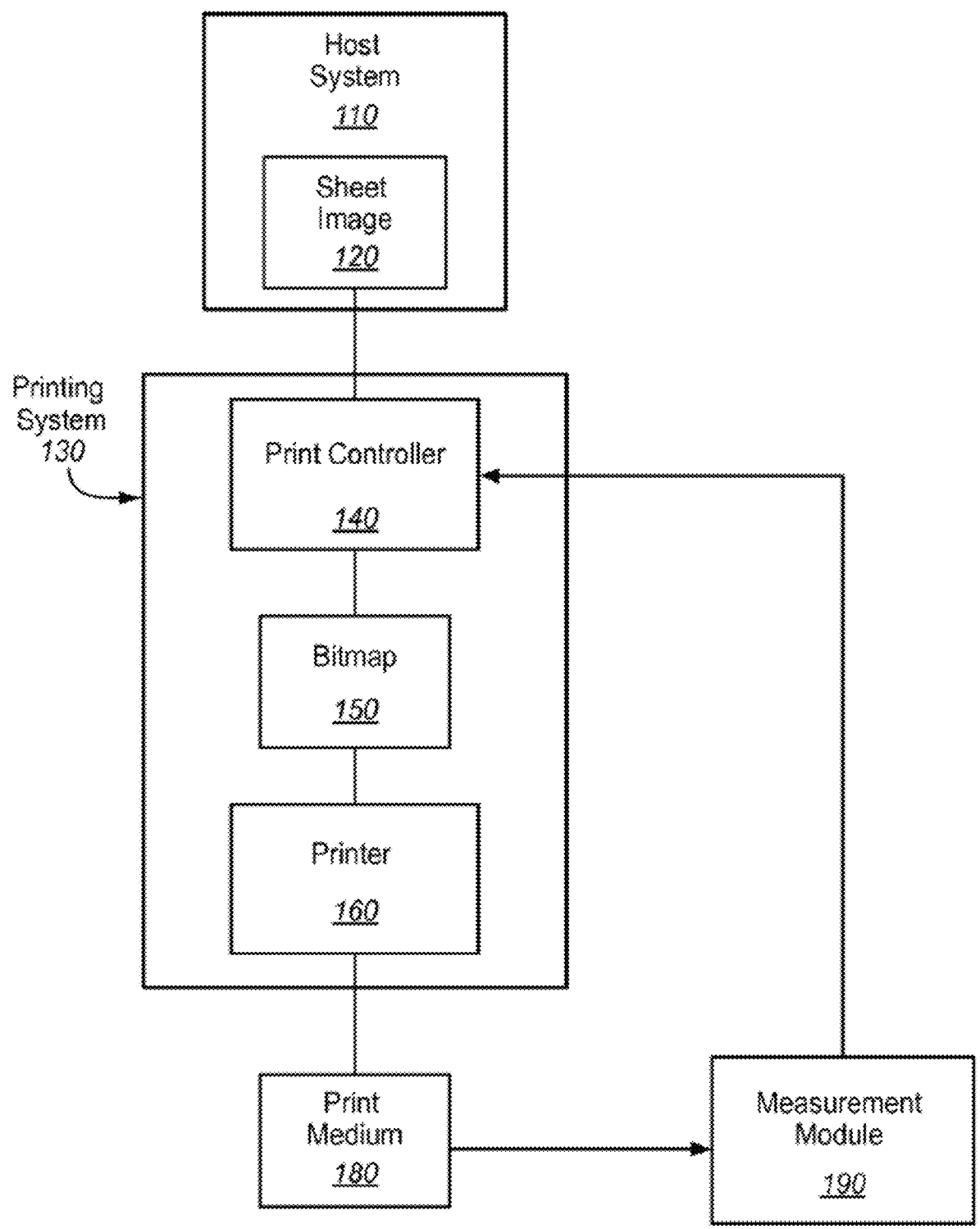
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper, plastic, metal, glass, textile, fabric or other tangible mediums suitable for printing) via a printer 160. The resulting print medium 180 may be printed in color and/or in any number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., ink, etc.) based on the sheet image 120. The printer 160 may be a stand-alone device communicably coupled to the printing system 130 or integrated in the printing system 130.

The print controller 140 may be any system, device, software, circuitry and/or other suitable component operable to transform the sheet image 120 for generating the bitmap 150, in accordance with printing onto the print medium 180. In this regard, the print controller 140 (e.g. Digital Front End, DFE) may include processing and data storage capabilities. In one embodiment, measurement module 190 (e.g. spectrodensitomer, spectrophotometer, etc.) is implemented as part of a medium classification system to obtain OD measurement data 220 of a halftone pattern applied to print medium 180. The OD measurement data 220 is communicated (e.g., received) to print controller 140 to be used in the medium classification process. The measurement system may be a stand-alone process or be integrated into the printing system 130.

Ink deposition data 222 may also be communicated (e.g. received) to print controller 140 to be used in the medium classification as will be explained below. Though ink deposition data 222 is shown as received from outside print controller 140, other embodiments may feature ink deposition data 222 being be received from within print controller 140 (e.g. from a module or memory).

Figure 2A:
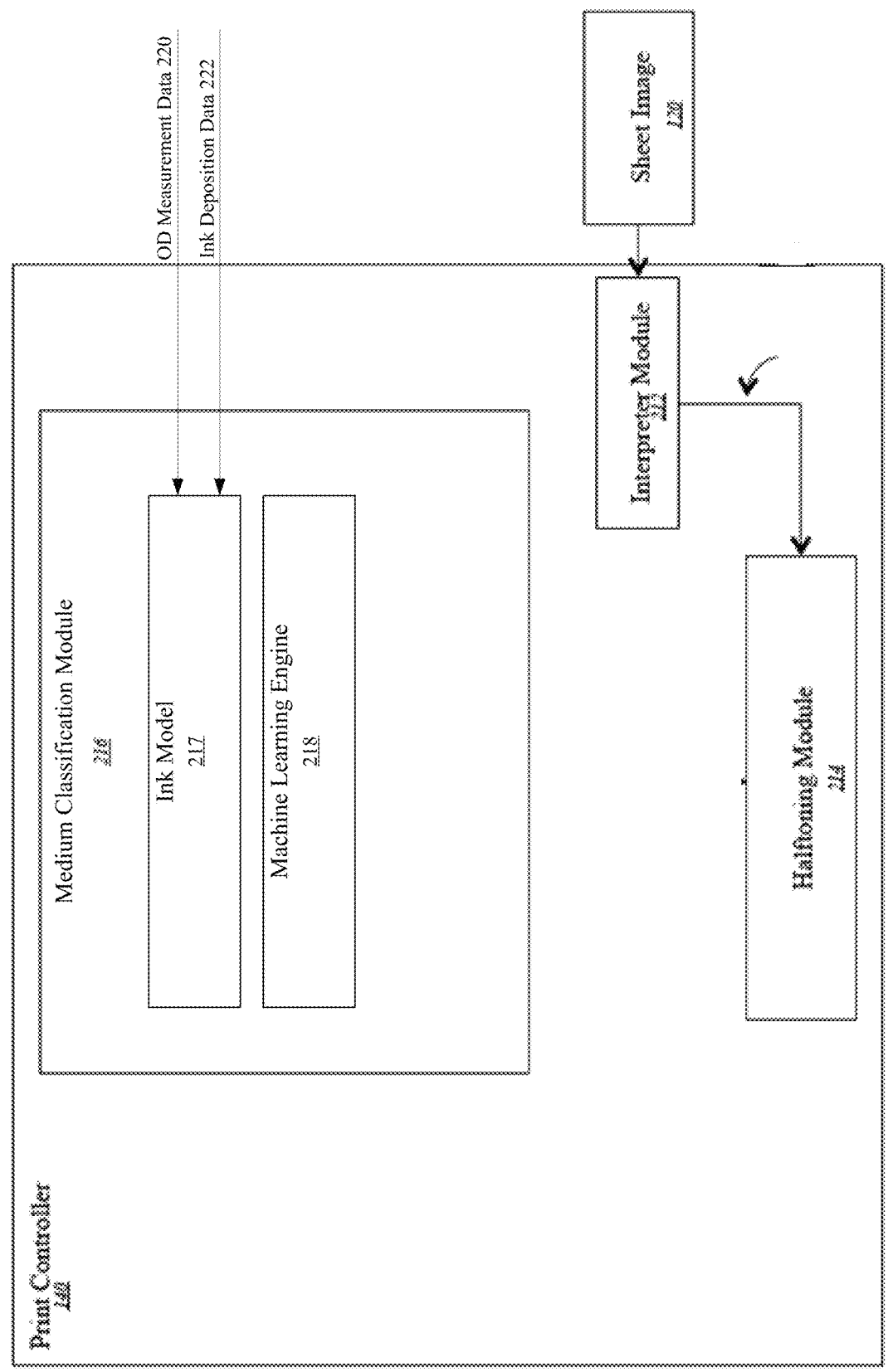
FIG. 2A is a block diagram of one embodiment of a print controller.

FIG. 2A is a block diagram illustrating an exemplary print controller 140. The print controller 140, in its generalized form, includes an interpreter module 212, a halftoning module 214, and medium classification module 216. These separate components may represent hardware used to implement the print controller 140. Alternatively or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pixels representing an image of the print job (i.e., a Continuous Tone Image (CTI)), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as halftone patterns of ink. For example, the halftoning module 214 may convert the pixels to halftone patterns of CMYK ink for application to the paper. Thus, halftoning module 214 converts a contone image to a binary/multi-bit level image at the same dots per inch (dpi) as the full sheetside bitmap. This is due to halftoning, which is typically implemented as a point operation creating a one to one correspondence of the contone pixels and the halftoned image pixels. The resulting halftoned image is used to drive a printhead mechanism of the printer 160.

In one embodiment, this halftoning path may be employed to interpret image data representing all of the possible gray levels that can be printed by all colors to determine the relationship between ink deposition and digital count, which may be used to determine the ink model 217. In this embodiment the halftoned image data is converted into deposition (ink per unit area) data (e.g. ink deposition data 222) by converting the halftoned image to ink volumes using drop sizes for the case of an ink jet printer. Alternately, the halftone design itself can be used to establish this deposition vs digital count relationship.

Print controller 140 also includes a medium classification module 216 that is implemented to classify a paper type for print production and apply a corresponding setting used to select the calibration for the printing system 130 to optimize (e.g., improve) print quality during an application of the sheet image 120 to the medium (e.g., paper) at printer 160. The selected calibration of the printing system 130 may be one of a plurality of calibrations that are stored in the printing system 130 and/or printer 160. According to one embodiment, medium classification module 216 classifies paper according to one of three print medium categories: Plain (or Untreated); Ink Jet Coated, or Ink Jet Treated. However, other embodiments may include additional or different categories.

Figure 2B:
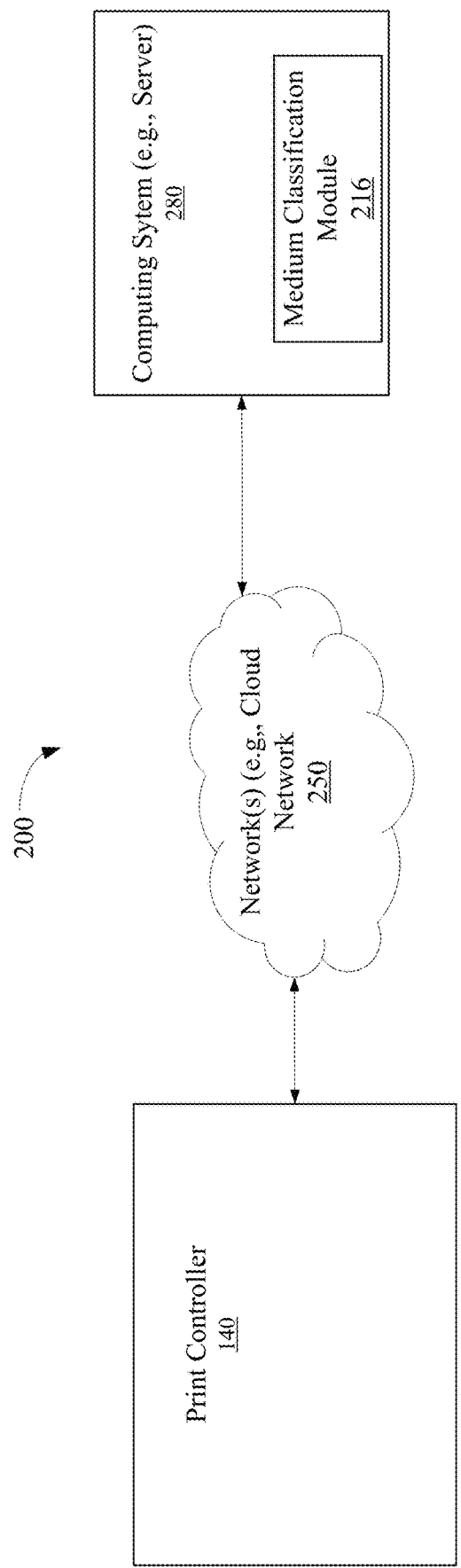
FIG. 2B illustrates one embodiment of a print controller implemented in a network.

Although shown as a component of print controller 140, other embodiments may feature medium classification module 216 included within an independent device, or combination of devices, communicably coupled to print controller 140. For instance, FIG. 2B illustrates one embodiment of a medium classification module 216 implemented in a network 200. In such an embodiment, medium classification module 216 is included within a computing device 280 to perform medium classification and transmit results to print controller 140 via a cloud network 250.

Referring back to FIG. 2A, medium classification module 216 performs medium classification via ink model 217 and machine learning engine 218 (or machine learning logic). Ink model 217 determines optical density (OD) vs ink deposition (e.g., magnitude of ink per unit area) for the paper that is to be classified. According to one embodiment, ink model 217 provides an accurate description as to how an ink interacts with a particular paper type.

In such an embodiment, the description is obtained by receiving OD measurement data 220 from measurement module 190 that provides the OD of ink applied to samples of the paper, as well as information regarding the halftone design used to apply the ink to the paper. From the halftone design, the quantity of ink actually deposited in an area (e.g., ink deposition data 222) may be determined based on knowing the drop sizes and how many drops that were printed at each level. In the case of point operation halftoning, the deposition vs digital count information may be obtained by analyzing the threshold array.

Figure 3:
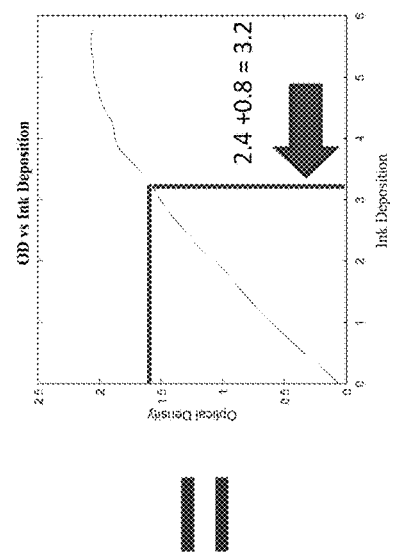
FIG. 3 illustrates graphs of functions implemented to generate an ink model.
Figure 3:
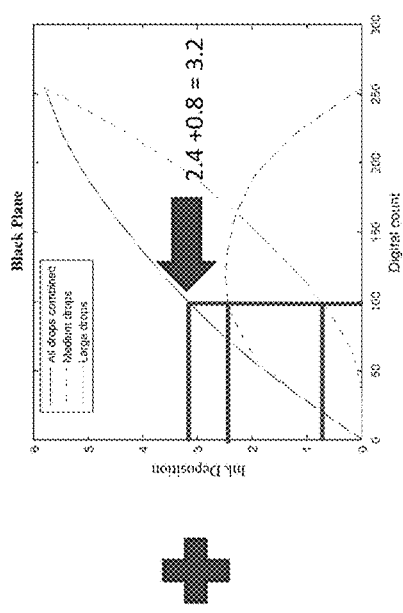
Figure 3:
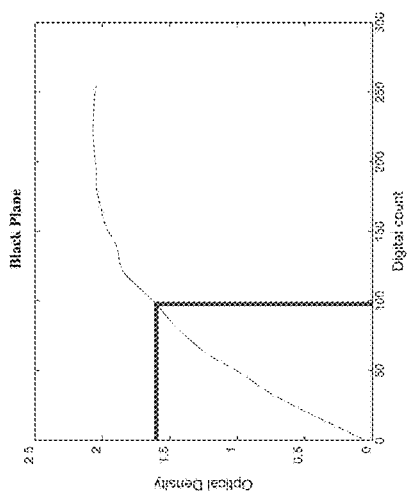

FIG. 3 illustrates graphs of functions implemented to generate an ink model 217. As shown in FIG. 3, having the measured OD vs digital count function (first graph) and the ink deposition vs digital count function (second graph) results in a plot of OD vs ink deposition function (third graph). In one embodiment, the OD vs digital count (DC) data matches the Ink deposition vs DC case (e.g., both representing uncalibrated responses). In the preferred embodiment, uncalibrated data should be used because the OD values and ink deposition will be the largest. This allows one to use interpolated rather than extrapolated data to create an accurate ink model 217.

In another embodiment, the measured OD vs digital count function may be derived from the OD measurement data 220, the OD vs ink deposition function may be derived from the ink deposition data 222 and the OD vs ink deposition function (e.g. ink model 217) may be created based on the OD measurement data 220 and the ink deposition data 222.

In one embodiment, the OD vs ink deposition relationship is used as inputs to a regression to provide parameters that describe the relationship. In a further embodiment, a regression employing a modified version of the Weibull CDF is used for the ink model 217. The modified Weibull CDF incorporates paper white and the solid area maximum optical density. This modified Weibull CDF will herein be described as "Weibull CDF" to avoid confusion.

The forward Weibull CDF ink model relates ink deposition to OD, while the inverse Weibull CDF ink model relates OD to ink deposition. The classical version of a Weibull cumulative distribution function (CDF) describes the probability that a real-valued random variable X with a given probability will be found at a value less than or equal to x (where x is a one possible value of the random variable X). Accordingly, the classical Weibull CDF provides the "area under the curve" function of the Weibull probability density function (PDF).

In one embodiment, ink deposition is represented by:

$$\text{Ink Deposition} = \frac{\text{Total Ink Mass}}{\text{Area}},$$
$$\text{Total Ink Mass} = \sum_{Area} \text{Drop sizes milligrams}$$

Thus, ink deposition is defined as the total ink mass applied to a unit area. In a preferred embodiment the area over which the drop sizes are summed is the printed area associated with the multidrop or binary threshold array (e.g., each pel of the threshold array occupies an area defined by the printer dpi). The drop sizes are the determined by converting the halftone threshold array to an array of drop sizes, where for each DC level the respective drop sizes have been determined. In one embodiment, a four parameter Weibull model is implemented using $OD=(p(3)*(1-\exp^{((-(x/p(1))^\wedge p(2)))})+p(4)$.

In such an embodiment, a two-parameter classical Weibull CDF function has been extended to four parameters to create an ink model for the paper. The two additional parameters allow the model to account for paper white and absolute paper referenced OD, where OD=Optical Density, x=ink deposition mass per area, p(1)=ink mass per area scale factor, which is similar to the classical Weibull scale factor in the way it influences the shape of the function, p(2)=slope factor, p(3)+p(4)=maximum predicted OD at infinite ink deposition and p(4)=paper OD. As a result, ink model 217 derives the 4 Weibull distribution function parameters that are forwarded to machine learning engine 218, which searches and selects a category of the paper.

Machine learning engine 218 receives the 4 parameters for each color channel supported by printing system 130 for a medium. Thus, machine learning engine 218 receives 16 parameters (e.g., for a CMYK embodiment) as input features. In one embodiment, the machine learning engine 218 may receive 4 parameters for at least one of the color channels supported by printing system for a medium. In a further embodiment, machine learning engine 218 implements a k-nearest neighbor algorithm to classify an unknown medium, in this case, it is used to predict the medium (e.g., paper) type (or category).

The engine has been trained using features representative of medium characteristics, in this case, the Weibull ink model parameters to accurately determine the paper type. The training can be determined using a set of known paper types and parameters, however it can also be refined and improved by adding data from known paper types which have been measured. In this way the learning is adaptive to new information from media that customers use.

In a further embodiment, the k-nearest neighbor algorithm may be implemented via a Ball Tree space partitioning data structure in order to organize points in a multi-dimensional space though other suitable ulti-dimensional spaces may also be used. In such an embodiment, nearest neighbor search queries are expedited, such that the objective is to find the k points in the tree that are closest to a given test point by some distance metric (e.g. Euclidean distance in the space). Moreover, the k-nearest neighbor implementation, being an instance-based learning method, may train the model without memorizing a previous model once the dataset is updated. However, other embodiments may implement other machine learning algorithms (e.g., Random Forests).

Figure 4:
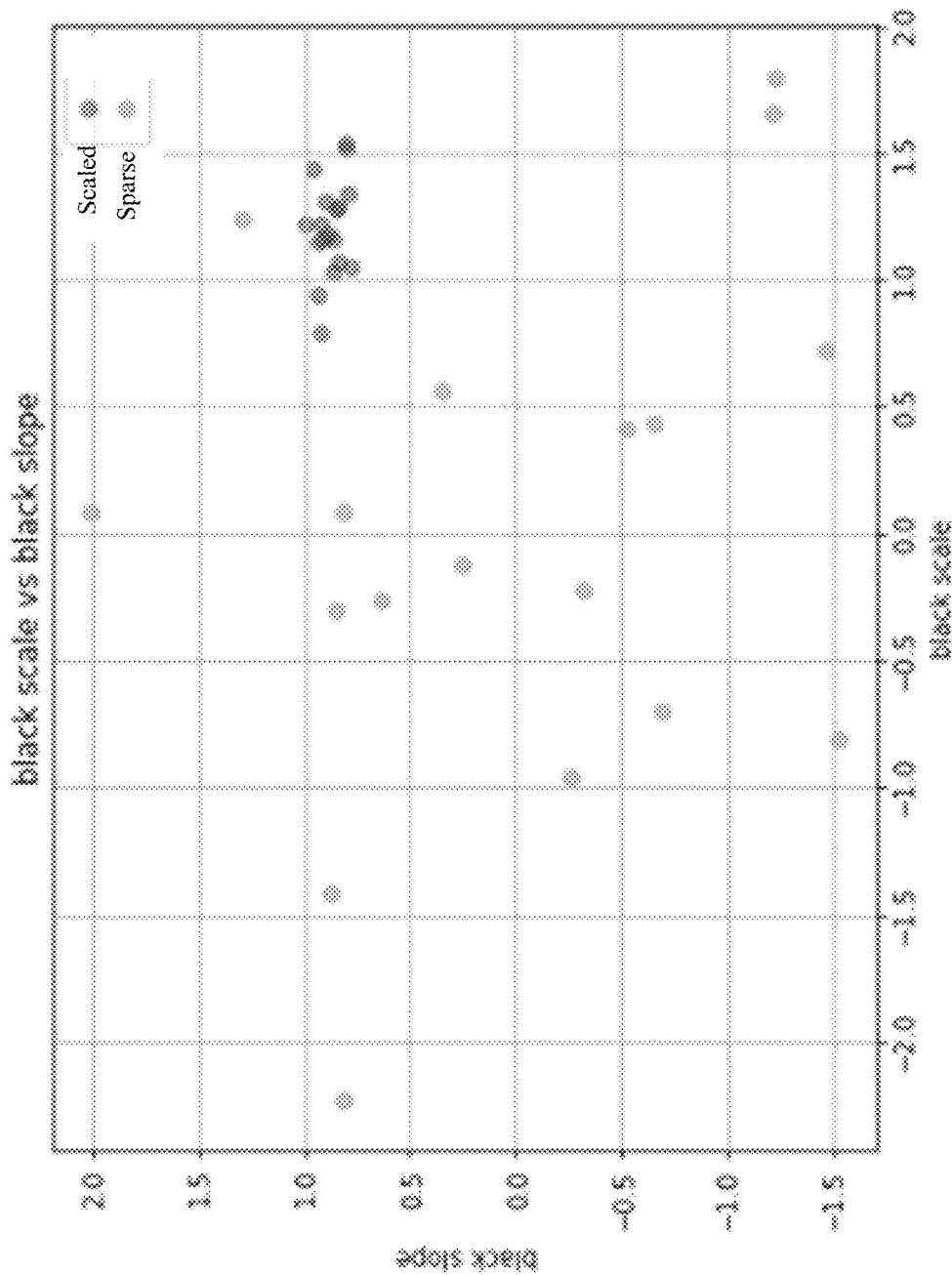
FIG. 4 illustrates one embodiment of a graph of sparse vs scaled input features.
Figure 5A:
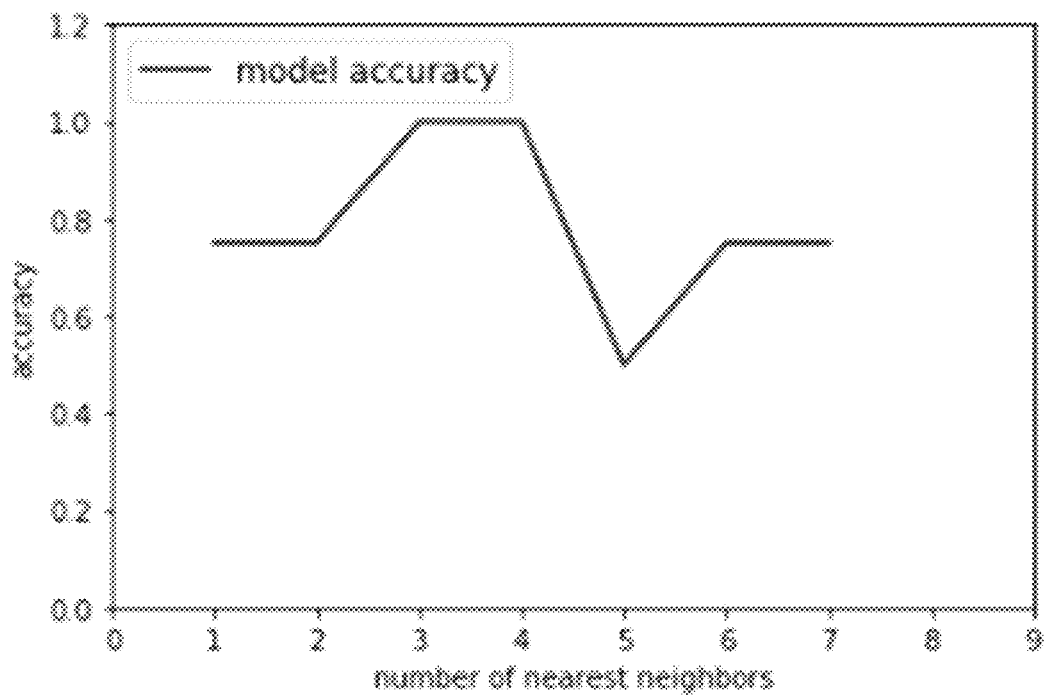
FIGS. 5A & 5B illustrate embodiments of model accuracy graphs.
Figure 5B:
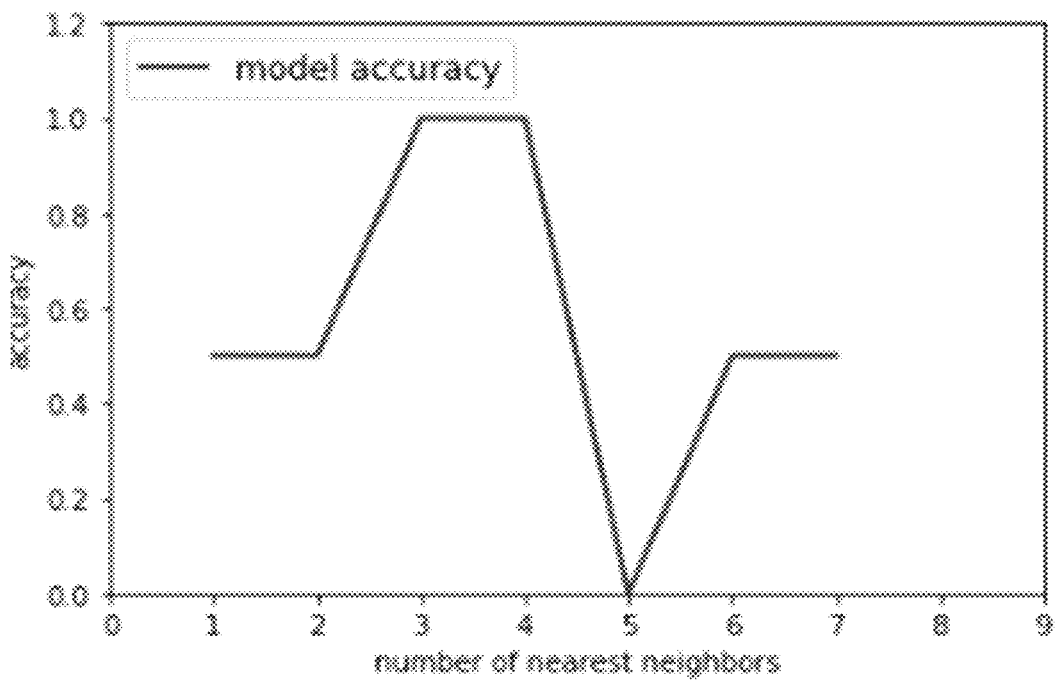

According to one embodiment, machine learning engine 218 inserts the input features into a data structure as raw sparse data prior to normalization. In such an embodiment, the data is normalized via a scaling between 0-1. FIG. 4 illustrates one embodiment of a graph showing sparse vs scaled input features. As shown in FIG. 4, the scaled input features are clustered approximately around the (1,1) coordinates in the black color plane scale vs black plane slope Weibull parameter plot, while the raw sparse features are relatively scattered.

Once the input features are normalized, one or more k-points are inserted into the structure. In one embodiment, the k points are user defined constants that are each associated with a paper category. In such an embodiment, 3 k-points are implemented, and are associated with the Plain; Ink Jet Coated, or Ink Jet Treated paper categories supported by printing system 130. As shown in model accuracy graphs (e.g., calculated using a confusion matrix) in FIGS. 5A & 5B, 3 and 4 are optimum numbers for nearest neighbors or the current data set.

Subsequently, the k-nearest neighbor algorithm is performed to determine a k-point to which the input features are closest. Thus, if:
$D=\{(x_i, y_i)\}_{i=1}^m$ training examples, where
$x_i \in R^D$ and $y_i \in \{1, \ldots, C\}$,
the class $\hat{y}$ is predicted for the test sample X.

Next, the algorithm finds the K training examples in D "nearest" to X (e.g., $N_k(X, D)$), and assigns $\hat{y}$ the majority label of $N_k$, such that:

$$p(y = c \mid x, D, K) = \frac{1}{K} \sum_{i \in N_K(x,D)} I(y_i = c)$$

Based on a Ball Tree searching, the data is recursively divided into hyper-spheres with nodes defined by a centroid (C) and radius (r). In one embodiment, the number of candidate points for a neighbor search is reduced through:

$$|x+y| < |x|+|y|$$

As mentioned above, the result of the k-nearest neighbor algorithm results in machine learning engine 218 providing a category in which the paper type is most closely related.

Figure 6:
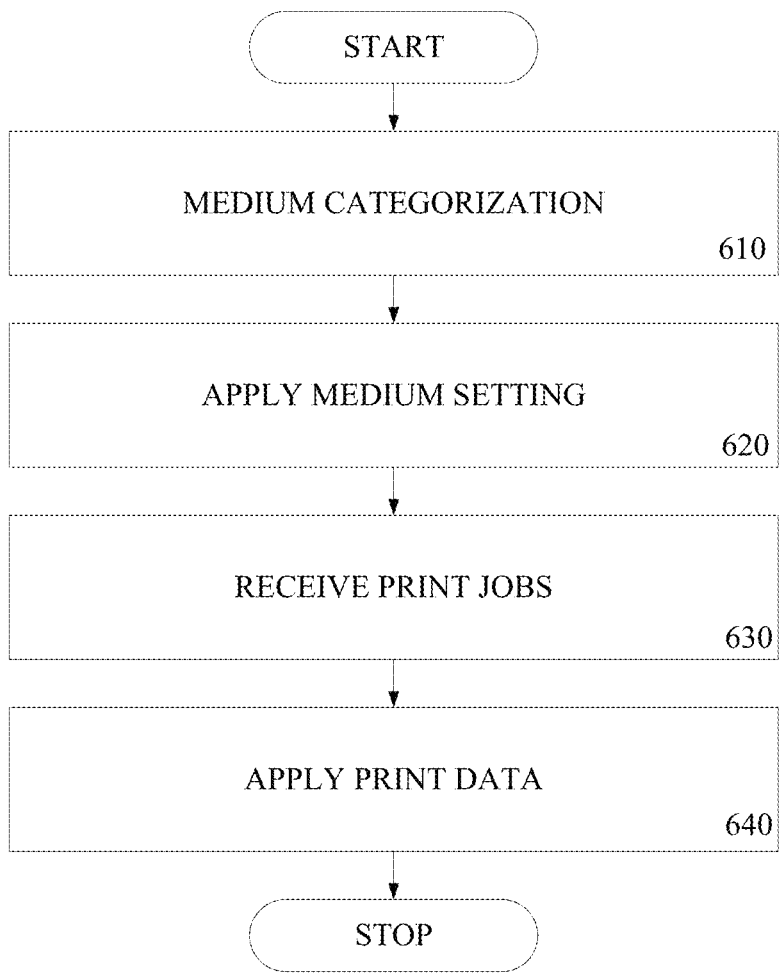
FIG. 6 is a flow diagram illustrating one embodiment of a process performed at a printing system.
Figure 7:
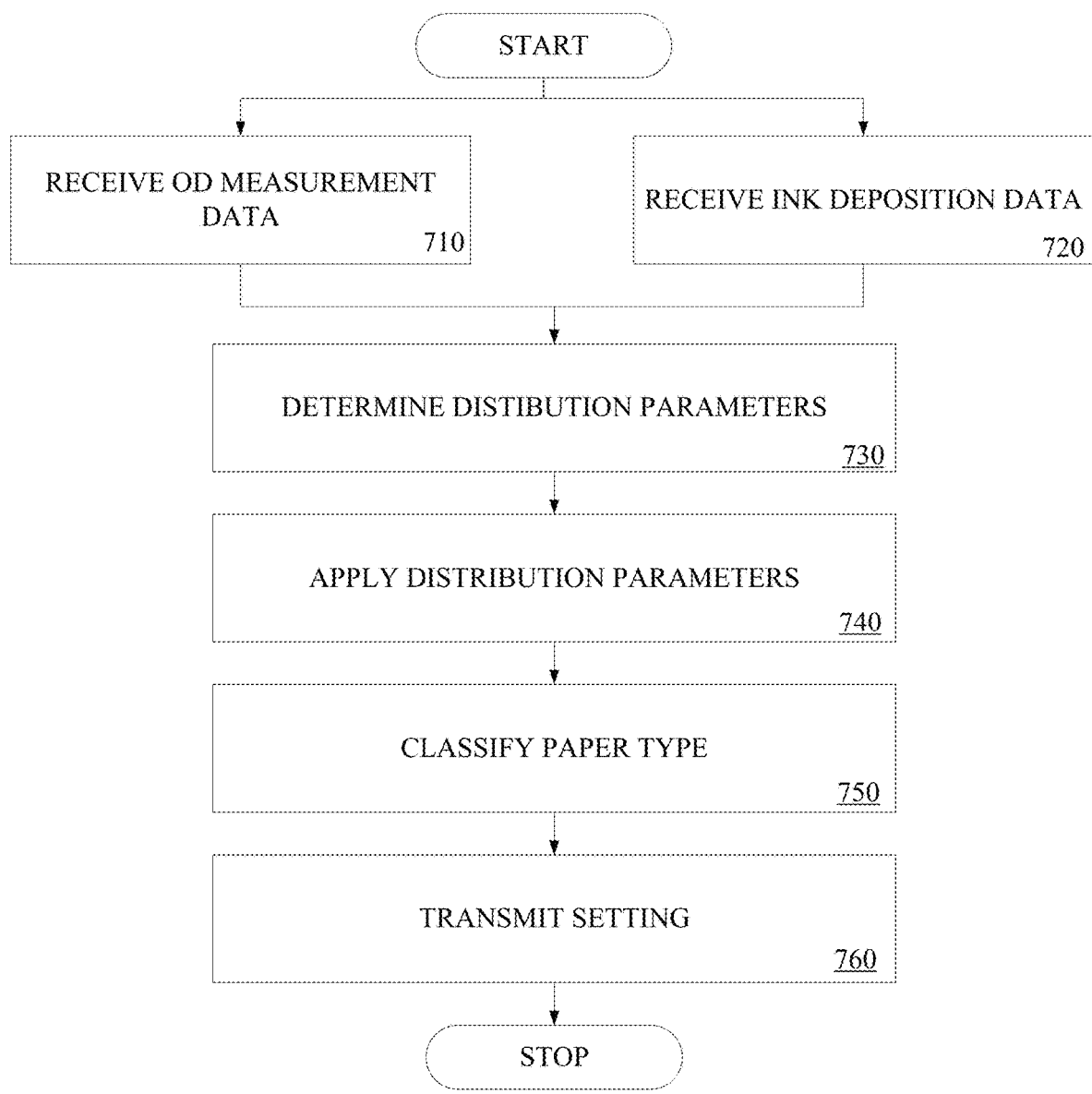
FIG. 7 is a flow diagram illustrating one embodiment of a process for classifying a print medium.

FIG. 6 is a flow diagram illustrating one embodiment of a process for implementing a medium classification process at a printing system. At processing block 610, medium classification is performed on paper representing a type to which sheet images (or print data) is to be applied. FIG. 7 is a flow diagram illustrating one embodiment of a process for categorizing a print medium.

At processing blocks 710 and 720, OD measurement data 220 and/or ink deposition data 222, respectively, may be received. At processing block 730, the set of distribution function parameters are determined based on the OD measurement data 220 and the ink deposition data 222. At processing block 740, the distribution function parameters are provided as input features to a machine learning engine 218 that implements a k-nearest neighbor algorithm to search for and select a category for the paper type. At processing block 750, the paper type is classified as being associated with a particular category. At processing block 760, a setting indicating the category of the paper is transmitted.

In an embodiment featuring network 200 shown in FIG. 2B, the OD measurement data 220 and/or ink deposition data 222 is transmitted from print controller 140 to computing system 280, where the above-described medium classification is performed. Subsequently, print controller 140 receives the setting indicating the paper category via cloud network 250. The setting provided represents a suggested paper type, which can be overridden in the case where the operator knows that the actual media type is different than the recommended one. This provides a quality check to prevent cases where the actual paper based on measurements is not the same as the paper type the operator believes they have installed for the print run.

Referring to FIG. 6, the category selected during the medium classification process is applied as a medium setting at the printing system, processing block 620, and is used to select the calibration for the printing system to produce one or more print jobs using the paper. At processing block 630, one or more print jobs are received. At processing block 640, print data included in the one or more print jobs is applied to the paper.

Figure 8:
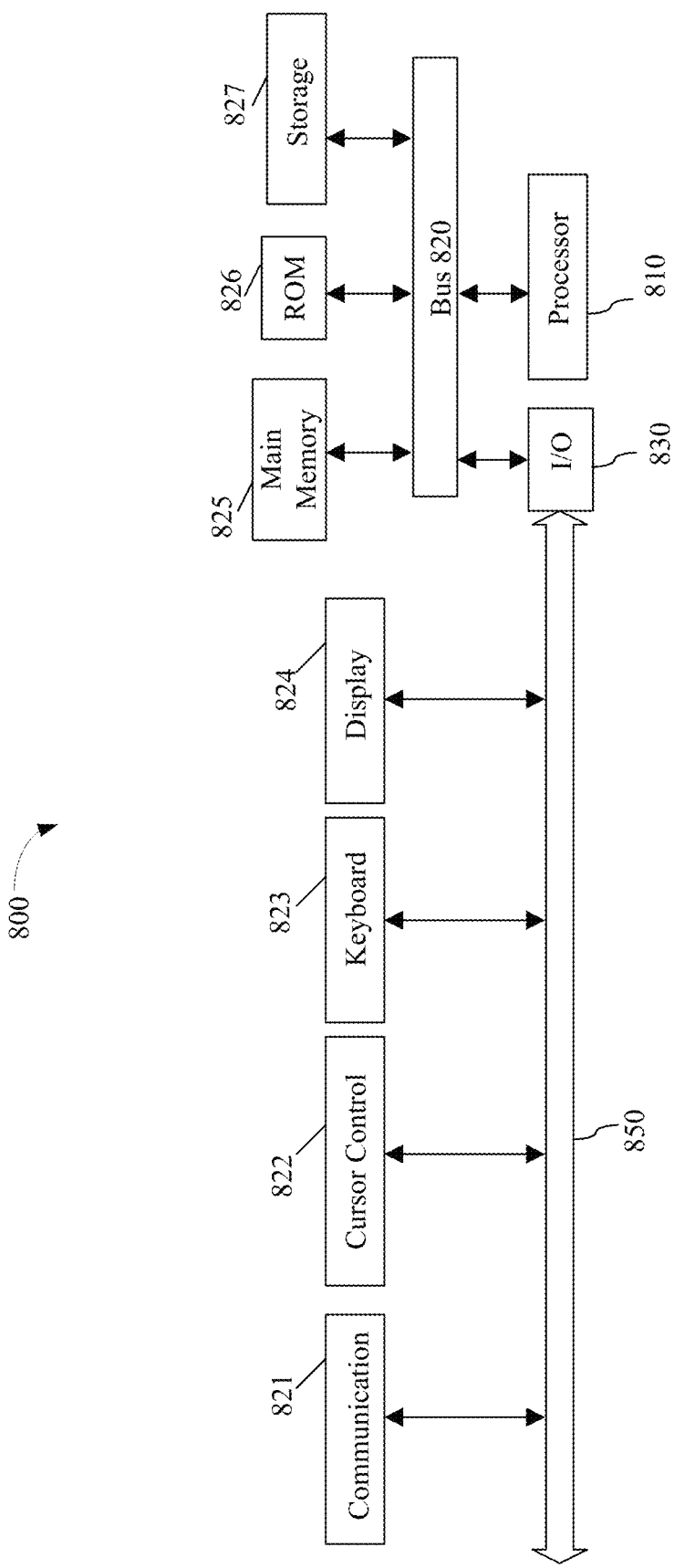
FIG. 8 illustrates one embodiment of a computer system.

FIG. 8 illustrates a computer system 800 on which print controller 140 and/or halftone calibration module 216 may be implemented. Computer system 800 includes a system bus 820 for communicating information, and a processor 810 coupled to bus 820 for processing information.

Computer system 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and or other static storage device 826 coupled to bus 820 for storing static information and instructions used by processor 810.

A data storage device 827 such as a magnetic disk or optical disc and its corresponding drive may also be coupled to computer system 800 for storing information and instructions. Computer system 800 can also be coupled to a second I/O bus 850 via an I/O interface 830. A plurality of I/O devices may be coupled to I/O bus 850, including a display device 824, an input device (e.g., a cursor control device 822 and/or an alphanumeric input device 823). The communication device 821 is for accessing other computers (servers or clients). The communication device 821 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store medium classification logic; and
   one or more processors coupled with the at least one physical memory device to execute the medium classification logic to receive optical density (OD) measurement data corresponding to application of a halftone pattern using ink on a print medium in a printing system, receive ink deposition data corresponding to application of the halftone pattern using the ink in a printing system, determine a set of distribution function parameters based on the OD measurement data and the ink deposition data, apply the set of distribution function parameters to machine learning logic trained to classify the print medium and classify the print medium as a first of a plurality of print medium categories based on the machine learning logic.

2. The system of claim 1, further comprising a printing system.

3. The system of claim 1, wherein the medium classification logic transmits a first setting indicating that the print medium is to be classified as the first of the plurality of print medium categories.

4. The system of claim 1, wherein the machine learning logic is trained by applying a plurality of training samples each categorized with one of the plurality of print medium categories.

5. The system of claim 1, wherein the medium classification logic determines an OD versus ink deposition relationship for the printing system based on the received OD measurement data.

6. The system of claim 5, wherein the set of distribution function parameters comprises distribution function parameters associated with each of a plurality of color channels supported by the printing system.

7. The system of claim 6, wherein the machine learning logic receives the set of distribution function parameters associated with each of the plurality of color channels and classifies the print medium based on the plurality of training samples closest in distance to a point.

8. The system of claim 7, wherein the machine learning logic classifies the print medium as comprising the first print medium category based on the plurality of training samples closest in distance to the point.

9. The system of claim 8, wherein the machine learning logic performs a k-nearest neighbor model to determine the one of the plurality of training samples closest in distance to the point in order to categorize the print medium.

10. The system of claim 1, wherein training the machine learning logic comprises applying a plurality of training samples each categorized with one of a plurality of print medium categories.

11. A computer-readable medium having stored thereon instructions that, when executed by one or more processors, cause the one or more processors to:
 receive optical density (OD) measurement data corresponding to application of a halftone pattern using ink on a print medium in a printing system;
 receive ink deposition measurement data corresponding to application of the halftone pattern using the ink in a printing system;
 determine a set of distribution function parameters based on the OD measurement data and the ink deposition measurement data;
 apply the set of distribution function parameters to machine learning logic trained to classify the print medium; and
 classify the print medium as a first of a plurality of print medium categories based on the machine learning logic.

12. The machine-readable medium of claim 11, having stored thereon instructions that, when executed by one or more processors, further cause the one or more processors to transmit a first setting indicating that the print medium is to be classified as the first print medium category.

13. The machine-readable medium of claim 11, wherein the machine learning logic is trained by applying a plurality of training samples each categorized with one of the plurality of print medium categories.

14. The machine-readable medium of claim 11, having stored thereon instructions that, when executed by one or more processors, further cause the one or more processors to determine an OD versus ink deposition relationship for the printing system based on the received OD measurement data.

15. The machine-readable medium of claim 14, wherein the set of distribution function parameters comprises distribution function parameters associated with each of a plurality of color channels supported by the printing system.

16. The machine-readable medium of claim 15, wherein applying the set of distribution function parameters to machine learning logic comprises:
 the machine learning logic receiving the set of distribution function parameters associated with each of the plurality of color channels; and
 classifying the print medium based on the plurality of training samples closest in distance to a point.

17. A method comprising:
 receiving optical density (OD) measurement data corresponding to application of a halftone pattern using ink on a print medium in a printing system;
 receiving ink deposition measurement data corresponding to application of the halftone pattern using the ink in a printing system;
 determining a set of distribution function parameters based on the OD measurement data and the ink deposition measurement data;
 applying the set of distribution function parameters to machine learning logic trained to classify the print medium; and
 classifying the print medium as a first of a plurality of print medium categories based on the machine learning logic.

18. The method of claim 17, further comprising transmitting a first setting indicating that the print medium is to be classified as the first print medium category.

19. The method of claim 17, wherein the machine learning logic is trained by applying a plurality of training samples each categorized with one of the plurality of print medium categories.

20. The method of claim 17, further comprising determining an OD versus ink deposition relationship for the printing system based on the received OD measurement data.

* * * * *